United States Patent
Semel et al.

(10) Patent No.: US 12,520,055 B2
(45) Date of Patent: Jan. 6, 2026

(54) STORAGE MANAGEMENT OF EVENTS GENERATED BY AN EVENT-BASED VISION SENSOR

(71) Applicant: Sony Semiconductor Solutions Corporation, Atsugi (JP)

(72) Inventors: Lavi Semel, Tel Aviv (IL); Eitan Weissman, Tel Aviv (IL); Itay Lusky, Kfar Saba (IL)

(73) Assignee: Sony Group Corporation, Tokyo (JP)

( * ) Notice: Subject to any disclaimer, the term of this patent is extended or adjusted under 35 U.S.C. 154(b) by 68 days.

(21) Appl. No.: 18/711,132

(22) PCT Filed: Nov. 23, 2022

(86) PCT No.: PCT/IB2022/061320
§ 371 (c)(1),
(2) Date: May 17, 2024

(87) PCT Pub. No.: WO2023/095010
PCT Pub. Date: Jun. 1, 2023

(65) Prior Publication Data
US 2025/0024165 A1    Jan. 16, 2025

Related U.S. Application Data

(60) Provisional application No. 63/282,703, filed on Nov. 24, 2021.

(51) Int. Cl.
*H04N 25/47* (2023.01)
*H04N 25/707* (2023.01)

(52) U.S. Cl.
CPC ........... *H04N 25/47* (2023.01); *H04N 25/707* (2023.01)

(58) Field of Classification Search
CPC ...... H04N 25/47; H04N 25/707; H04N 23/71; H04N 23/60; H04N 25/77
See application file for complete search history.

(56) References Cited

U.S. PATENT DOCUMENTS

2016/0080670 A1* 3/2016 Rangan ................. H04N 25/47
  348/302
2017/0127005 A1  5/2017 Park
(Continued)

FOREIGN PATENT DOCUMENTS

EP     3694202 A1    8/2020

OTHER PUBLICATIONS

International Search Report and Written Opinion mailed on Feb. 17, 2023, received for PCT Application PCT/IB2022/061320, filed on Nov. 23, 2022, 7 pages.

*Primary Examiner* — Mekonnen D Dagnew
(74) *Attorney, Agent, or Firm* — XSENSUS LLP

(57) ABSTRACT

An apparatus includes an event memory and processing logic. The event memory is configured to store events corresponding to a plurality of pixels, the events are indicative of changes in luminance levels detected by the pixels. The processing logic is configured to define a mapping that maps events to respective locations in the event memory, to receive a given event generated by a given pixel among the plurality of pixels, to map the given event to multiple locations in the event memory using the mapping, and store event data indicative of the given event in the multiple locations, and, in reading the given event, to map the given event to the multiple locations in the event memory using the mapping, and to verify that the given event is valid based on the event data stored in the multiple locations.

20 Claims, 4 Drawing Sheets

(56) References Cited

U.S. PATENT DOCUMENTS

2022/0230329 A1* 7/2022 Ito .................... H04N 23/685
2023/0336682 A1* 10/2023 Ise .................... H04N 23/81
2024/0282070 A1* 8/2024 Seo ................... H04N 23/667

* cited by examiner

STORAGE MANAGEMENT OF EVENTS GENERATED BY AN EVENT-BASED VISION SENSOR

CROSS-REFERENCE TO RELATED APPLICATIONS

This application is based on PCT filing PCT/IB2022/061320, filed Nov. 23, 2022, which claims the benefit of U.S. Provisional Patent Application 63/282,703, filed Nov. 24, 2021, the entire contents of each are incorporated herein by reference.

TECHNICAL FIELD

Embodiments described herein relate generally to image sensing, and particularly to methods and systems for storage management of data produced by an Event-based Vision Sensor (EVS).

BACKGROUND

An image sensor typically comprises an array of light-sensitive elements (e.g., photodiodes) that convert light into electrical analog signals. The amplitudes of the analog signals depend on the luminance levels to which the light-sensitive elements are exposed and on the exposure time. The analog signals are typically further sampled and converted into digital luminance values.

Various types of image sensors are known. For example, a Red-Green-Blue (RGB) image sensor is a color sensor in which each of the light-sensitive elements is sensitive to one of the red, green, and blue colors. As another example, the Event-based Vision Sensor (EVS) is a new emerging type of an image sensor, designed to detect changes in the luminance level sensed, and is suitable for computer vision and other applications that involve motion scenes.

SUMMARY

An embodiment that is described herein provides an apparatus that includes an event memory and processing logic. The event memory is configured to store events corresponding to a plurality of pixels, the events are indicative of changes in luminance levels detected by the pixels. The processing logic is configured to define a mapping that maps events to respective locations in the event memory, to receive a given event generated by a given pixel among the plurality of pixels, to map the given event to multiple locations in the event memory using the mapping, and store event data indicative of the given event in the multiple locations, and, in reading the given event, to map the given event to the multiple locations in the event memory using the mapping, and to verify that the given event is valid based on the event data stored in the multiple locations.

In some embodiments, the plurality of pixels are arranged in a Two-Dimensional (2D) array, the event includes multiple event parameters including (i) a time of occurrence of the given event (ii) a position of the given pixel in the 2D array, and (iii) a polarity value associated with a variation of the luminance level detected by the given pixel. In other embodiments, the event data indicates whether the given event has been written to the event memory, and the processing logic is configured to verify that the given event is valid by verifying that the event data in all the multiple locations indicates that the given event has been written to the event memory. In yet other embodiments, the event data includes a counter value, and the processing logic is configured to increment the counter value in the multiple locations upon writing the given event to the event memory, and upon reading the given event from the event memory, to verify that the given event is valid by verifying that the counter values in all the multiple locations exceed a specified threshold number.

In an embodiment, the processing logic is configured to update event data in the multiple locations upon writing the given event to the event memory, and upon reading the given event from the event memory, to verify that the given event is valid by verifying that the event data in all the multiple locations meet a specified verification criterion. In another embodiment, the mapping includes a plurality of mapping functions for generating the respective locations, and the processing logic is configured to map the given event to the multiple locations using multiple respective mapping functions selected from among the plurality of the mapping functions. In yet another embodiment, the selected mapping functions are associated with a polarity value of the given event.

In some embodiments, an application receiving the events requires a specified rate of false events that were never written to the event memory, and the processing logic is configured to control the rate of the false events so as to meet the specified rate of false events and a rate of the events received from the pixels, by reselecting the multiple mapping functions from among the plurality of the mapping functions. In other embodiments, a temporal-spatial distribution of the received events varies in time, and the processing logic is configured to monitor the temporal-spatial distribution of the received events, and to control a rate of false events that were never written to the event memory, among the events being read from the event memory, by performing one or more of: (i) reselecting the multiple mapping functions from among the plurality of the mapping functions, (ii) modifying a storage space size allocated to the event memory, and (iii) filtering out some of the received events. In yet other embodiments, the event memory includes multiple memory banks that are accessible in parallel to one another, and the processing logic is configured to map the given event, using the selected multiple mapping functions, to respective locations in one or more of the multiple memory banks.

In an embodiment, the event memory is partitioned into multiple separate storage units that are accessible in parallel, and the processing logic is configured to map multiple events to the respective storage units using a predefined storage mapping function, to further map the multiple events, using the multiple selected mapping functions, to memory locations in the event memory belonging to the respective storage units, and to access the multiple events in the storage units in a single cycle. In another embodiment, the processing logic is configured to both (i) write an event to a given storage unit and (ii) read another event from another storage unit, within a single cycle. In yet another embodiment, the processing logic is configured to control a rate of false events that were never written to the event memory, by dynamically allocating storage space to the event memory.

In some embodiments, the events are representable in a temporal-spatial domain, and the processing logic is configured to store multiple received events both in the event memory and in a linked list data structure, and in reading a required event along with a group of multiple events surrounding the required event in the temporal-spatial domain, to scan the linked list for identifying the required event in the linked list, and to read the required event and the surrounding events from the event memory. In other embodiments, the given event includes multiple event parameters, and the processing logic is configured to apply the mapping to at least some of the multiple event parameters of the given event.

There is additionally provided, in accordance with an embodiment that is described herein, a method, including, storing in an event memory, events corresponding to a plurality of pixels, the events are indicative of changes in luminance levels detected by the pixels. A mapping that maps events to respective locations in the event memory is defined. A given event generated by a given pixel among the plurality of pixels is received, the given event is mapped to multiple locations in the event memory using the mapping, and event data indicative of the given event in the multiple locations is stored. In reading the given event, the given event is mapped to the multiple locations in the event memory using the mapping, and the given event is verified to be valid based on the event data stored in the multiple locations.

These and other embodiments will be more fully understood from the following detailed description of the embodiments thereof, taken together with the drawings in which:

DETAILED DESCRIPTION OF EMBODIMENTS

Overview

Figure 1:
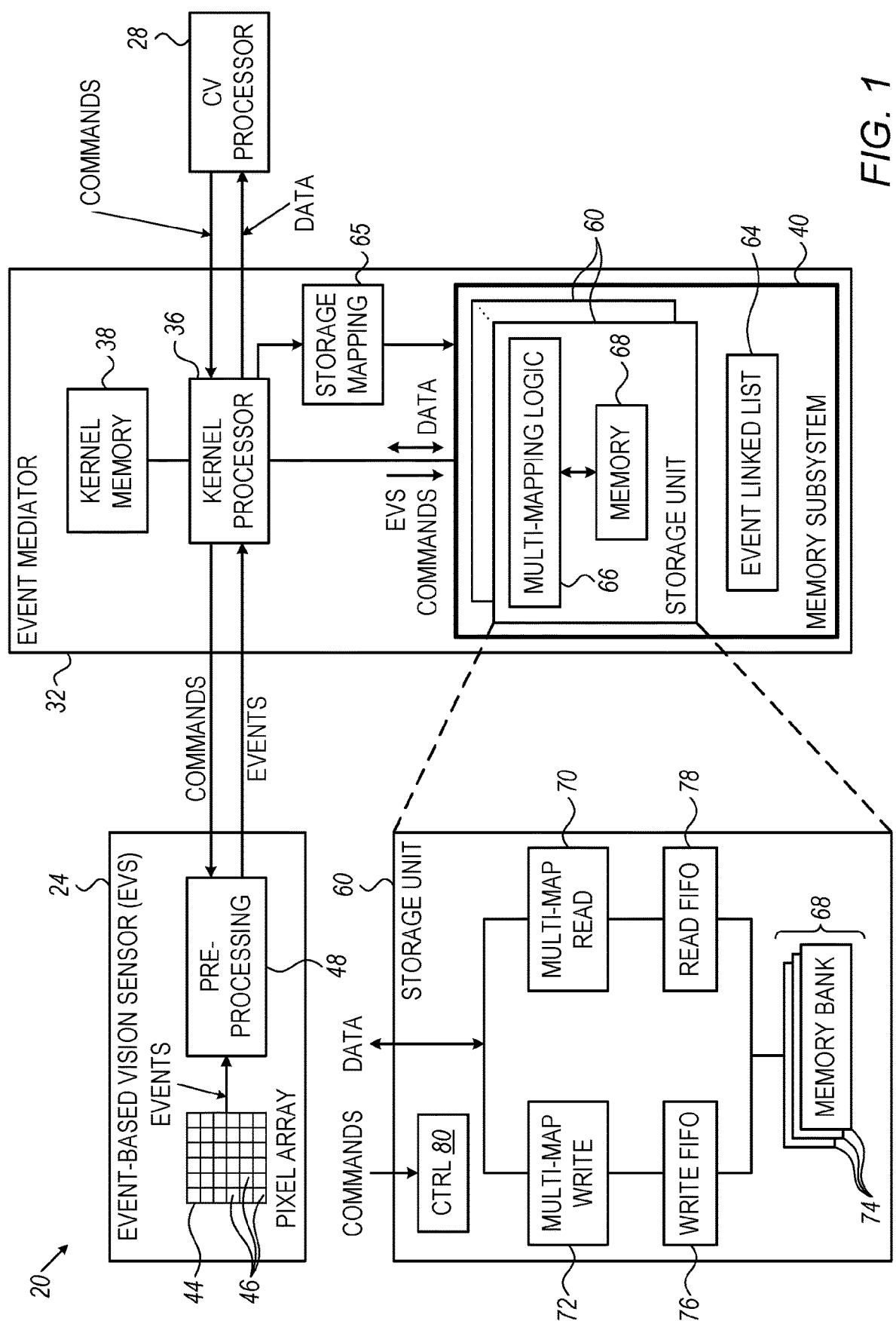
FIG. 1 is a block diagram that schematically illustrates an event-based Computer Vision (CV) system, in accordance with an embodiment that is described herein.

Embodiments that are described herein provide methods and systems for efficient storage management of events produced by an Event-based Vision Sensor (EVS).

Various applications require capturing visual information using an image sensor. A conventional image sensor typically outputs luminance data per image pixel for the entire image, even when the luminance levels change only in a small fraction of the image pixels between consecutive image frames, which requires large bandwidth and computation resources.

Unlike conventional image sensors, an Event-based Vision Sensor (EVS) reports luminance data only for image pixels in which the luminance level varies, thus reducing the amount of data output by the image sensor and the processing resources needed for processing the visual information captured.

An EVS typically comprises an array of pixel circuits, each of which individually sensing the luminance level. The pixel circuit compares the current luminance level to the luminance level previously captured by the same pixel circuit, and in response to detecting that the luminance level has changed by an amount larger than a specified threshold, the pixel circuit triggers and outputs a corresponding event. The EVS responds independently and asynchronously for every pixel circuit, according to changes happening in the scene. This is in contrast with a standard RGB sensor, which acquires full images (all pixels) at a constant rate. In practice, the pixel circuits typically report (and compare) a Log function of the luminance level.

In the present context, for the sake of brevity, the term "luminance level" commonly refers to the luminance level, or to the luminance level subjected to a Log function. In the present context the term "pixel circuit" is also referred to simply as a "pixel" for brevity.

In some embodiments, the EVS pixels are arranged in a Two-Dimensional (2D) array in any suitable geometrical configuration. For example, the pixels may be arranged in a rectangular matrix array. The event triggered by a given pixel in the 2D array comprises multiple event parameters, such as the time at which the event has occurred, the position (e.g., x and y coordinates) of the pixel in the 2D array, and a polarity value (e.g., having binary values such as +1 and −1) associated with the luminance change (e.g., indicating whether the luminance levels have changed from a dark level to a bright level or from a bright level to a dark level). After triggering an event, the pixel sets the new luminance level as a reference for triggering a subsequent event.

Event vision sensors can be viewed as data-driven sensors whose output depends on the amount of motion and/or brightness change in the scene. As such, with high-motion scenes the EVS typically produces events at a higher rate than with low-motion scenes.

In some EVS implementations, the event timestamps are sampled at a microsecond granularity and output independently and asynchronously. In other EVS solutions, the events are output in a synchronous manner, meaning that all the events happening at a certain (typically short) period of time are assigned the same timestamp. In other words, the EVS produces frames (packets) at a certain periodicity, wherein for each frame, the EVS outputs only triggered events with their polarity and position (x, y). An EVS of this sort is also referred to as a synchronous EVS.

The events output by the EVS are typically processed by a suitable processor that runs tasks such as Computer Vision (CV) or Artificial Intelligence (AI) tasks. The processor may run low-level tasks such as an optical flow, or high-level tasks such as image reconstruction (generating an image of the scene based on the events), motion detection, object classification and the like.

Some types of EVSs may have a spatial resolution on the order of a million pixels and operate at a frame rate of several thousand Frames Per Second (FPS), e.g., 2000 FPS. Such an EVS can generate up to 2 billion events per second, which is typically far beyond the processing and storage capabilities of the underlying computer vision system.

One way to accommodate high event rates could be to report only the number of events occurring per pixel within a predefined time interval (e.g., in 5 msec intervals). The main disadvantage of this approach, however, is that valuable time information of individual events is lost.

In various applications, events generated by an EVS are stored in a memory, pending further processing. One storage approach could be to store the events in a linked list data structure. This method may be considered memory-efficient, because only data that is being produced by the EVS sensor is actually stored. The main disadvantage of using a linked list, however, is that to access a specific event in the list the event needs to be searched sequentially along the list, which in the worst case may require scanning the entire list.

In another approach, the events could be stored in a 3D data structure, wherein two of the three dimensions represent the spatial domain (x, y) and the remaining domain represents the time domain divided into frames. An event with a position (x, y) generated at time t is mapped with its polarity p to the position (x, y) on the relevant frame. Although this 3D data structure supports fast read/write access, this approach is very inefficient in terms of storage space, because typically most of the time the event rate is low, and therefore at any given time most of the 3D memory remains unused. For example, a 3D memory that stores 100 frames for the last 50 ms, wherein each frame contains a Million entries for storing events, requires a storage space of a 100 million entries, most of which are unused.

Embodiments that will be described below employ smart event storage, based on the observation that the memory space required for storing all the events is sparse, meaning that only a small fraction (e.g., on the order of one percent) of the EVS pixels generate events in each frame. This implies that a storage space allocated for the events may be much smaller than the storage space required for storing the events of the entire pixel array, per frame, at the maximal event rate.

In the disclosed embodiments, an event memory is allocated a storage space that is significantly smaller than the theoretical 3D space. The event memory supports efficient writing and reading of events to and from the event memory. Events are mapped to locations in the event memory but this mapping may result in collisions, which in turn may cause reading false events. In some of the disclosed embodiments, the rate of the false events can be controlled so as to meet varying conditions such as the rate of received events and temporal-spatial distribution of the received events. Moreover, the rate of false events can be tuned to meet bandwidth and/or power consumption requirements, to achieve a certain noise level, e.g., below the noise level of the EVS, or to meet a false event rate imposed by the CV processor.

Consider an apparatus including an event memory and processing logic. The event memory is configured to store events corresponding to a plurality of pixels, wherein the events are indicative of changes in luminance levels detected by the pixels. The processing logic is configured to define a mapping that maps events to respective locations in the event memory, to receive a given event generated by a given pixel among the plurality of pixels, to map the given event to multiple locations in the event memory using the mapping, and to store event data indicative of the given event in the multiple locations. In reading the given event the processing logic is configured to map the given event to the multiple locations in the event memory using the mapping, and to verify that the given event is valid based on the event data stored in the multiple locations.

The event parameters may be specified in any suitable way. For example, in some embodiments the plurality of pixels are arranged in a Two-Dimensional (2D) array, and the event comprises multiple event parameters including (i) a time of occurrence of the given event (ii) a position of the given pixel in the 2D array, and (iii) a polarity value associated with a variation of the luminance level detected by the given pixel.

In various implementations different types of event data may be used. In one embodiment, the event data indicates whether the given event has been written to the event memory, and the processing logic verifies that the given event is valid by verifying that the event data in all the multiple locations indicates that the given event has been written to the event memory. In another embodiment the event data comprises a counter value, and the processing logic increments the counter value in the multiple locations upon writing the given event to the event memory, and upon reading the given event from the event memory, verifies that the given event is valid by verifying that the counter values in all the multiple locations exceed a specified threshold number. In yet another embodiment, the processing logic updates event data in the multiple locations upon writing the given event to the event memory, and upon reading the given event from the event memory, verifies that the given event is valid by verifying that the event data in all the multiple locations meet a specified verification criterion.

In mapping events to the multiple locations in the event memory, various types of mapping can be used. In an example embodiment, the mapping comprises a plurality of mapping functions for generating the respective locations, and the processing logic maps the given event to the multiple locations using multiple respective mapping functions selected from among the plurality of the mapping functions, the selected mapping functions are associated with a polarity value of the given event, so that the polarity value can be recovered upon reading the given event.

As noted above, the mapping of events to a relatively small event memory may result in reading false events, which were never written to the event memory. Several methods for controlling the rate of false events are described below.

In some embodiments, an application receiving the events (e.g., running on a CV processor) requires a specified rate of false events. In such embodiments the processing logic may control the rate of the false events so as to meet the specified rate of false events and a rate of the events received from the pixels, by reselecting the multiple mapping functions from among the plurality of the mapping functions. Reselection of the mapping functions means modifying the number of the selected mapping functions used per event, modifying the types of one or more of the selected mapping functions, or both.

In some embodiments the received events are distributed in accordance with a temporal-spatial distribution that varies in time. In these embodiments, the processing logic monitors the temporal-spatial distribution of the received events, and controls the rate of false events among the events being read from the event memory, by performing one or more of: (i) reselecting the multiple mapping functions from among the plurality of the mapping functions, (ii) modifying a storage space size allocated to the event memory, and (iii) filtering out some of the received events.

It is noted that the temporal-spatial distribution of the received events refers to the rate of the received events, in some embodiments, in which case the control of the rate of false events may be controlled based on monitoring the rate of received events.

In another embodiment for controlling the rate of false events, the processing logic controls the rate of false events by dynamically allocating storage space to the event memory. In general, the rate of false events increases with decreasing the size of the event memory.

In an embodiment, the event memory comprises multiple memory banks that are accessible in parallel to one another. In this embodiment, the processing logic is configured to map the given event, using the selected multiple mapping functions, to respective locations in one or more of the multiple memory banks. Using the memory banks allows parallel access to locations in the event memory in a single cycle, without causing a stall with high probability.

In some embodiments the event memory is partitioned into multiple separate storage units that are accessible in parallel, and the processing logic maps multiple events to the respective storage units using a predefined storage mapping function, which avoids collision in accessing the multiple storage units in parallel to one another. The processing logic further maps the multiple events, using the multiple selected mapping functions, to memory locations in the event memory belonging to the respective storage units, and accesses the multiple events in the storage units in a single cycle. Furthermore, the processing logic can both (i) write an event to a given storage unit and (ii) read another event from another storage unit, within a single cycle.

In some embodiments, the CV processor is required to read from the event memory events along with some pattern of neighboring events. In such embodiments, the processing logic stores the received events both in the event memory and in a linked list data structure. Upon reading a required event along with a group of multiple events surrounding the required event in a temporal-spatial domain, the processing logic scans the linked list for identifying the required event in the linked list, and reads the required event and the surrounding events from the event memory.

In the disclosed techniques, events generated by an EVS are efficiently buffered in an event memory to be accessed by a computer vision processor. To this end, event parameters are mapped to a relatively small memory using a suitable mapping. Methods for reducing the rate of reading false events that were never written to the event memory are considered, as well as efficient methods for accessing in the event memory multiple events in parallel. The disclosed embodiments are efficient in terms of the size of the event memory, throughput, latency, computational resources, and power consumption.

System Description

FIG. 1 is a block diagram that schematically illustrates an event-based Computer Vision (CV) system 20, in accordance with an embodiment that is described herein.

CV system 20 comprises an Event-based Vision Sensor (EVS) 24 coupled to a CV processor 28 via an event mediator 32 that comprises a kernel processor 36 coupled to a memory subsystem 40. The kernel processor receives events from EVS 24 and stores them in memory subsystem 40. The stored events may be later retrieved by CV processor 28 via the kernel processor. In some embodiments, event mediator 32 comprises a kernel memory 38, which the kernel processor uses for storing configuration, results of intermediate calculations, and other information. In an embodiment, in addition to storing the events received from the EVS in the memory subsystem, the kernel processor forwards at least some of the events received from the EVS directly to the CV processor. In some embodiments, the kernel processor may also filter input events before writing them to the event memory, and/or filter output events read from the event memory. For example, in an embodiment, the kernel processor gets from the CV processor a command for reading from the event memory a group of events, e.g., a 4-by-4-by-4 cube of events. In response to the command, the kernel processor accesses the memory subsystem, and outputs the events in the requested cube to the CV processor only if at least a specified number of the events in the cube are successfully validated. Otherwise, the kernel processor returns a Null response (or any other suitable response).

Kernel processor 36 receives from CV processor 28 commands directed to managing the storage and retrieval of events to and from the memory subsystem. EVS commands, directed to configuring and controlling the operation of EVS 24, may be sent directly to the EVS, or via the kernel processor.

CV system 20 may be used in various image and computer vision processing applications, and in particular in applications that involve motion scenes. Example relevant applications include visual inspection in food, medicine and cosmetic manufacturing, contaminant detection inspections in electronics manufacturing, machine abnormality detection in electronics manufacturing and in heavy industry and civil engineering, robotics, safety monitoring with consideration for privacy, e.g., at medical or long-term care sites, scientific measurement, and generating super-slow motion videos, to name a few. Event-based cameras benefit from high temporal resolution (e.g., a resolution of several microseconds between event frames, compared to tens of milliseconds in a typical RGB sensor), low latency, low power consumption and high dynamic range.

EVS 24 comprises a pixel array 44 comprising multiple pixel circuits 46 (also referred to herein simply as "pixels" as noted above). Pixels 46 may be arranged in any suitable geometrical configuration, such as, for example, in a 2D matrix. For example, pixel array 44 may comprise a 1280-by-720 matrix having approximately 0.92 Megapixels, a 640-by-512 matrix having approximately 0.32 Megapixels, or any other matrix or other suitable pixel array configuration.

Pixels 46 generate events depending on light stimulus and other parameters of the EVS. Pre-processing logic 48 processes the events prior to sending them to the event mediator, e.g., by applying to the events certain filter operations. Each pixel 46 individually monitors the luminance level it perceives and triggers an event in response to detecting that the (Log) luminance level has changed by a specified (Log) luminance difference relative to previous (Log) luminance level, which caused triggering of the previous event. The specified (Log) luminance difference may be predefined, statically configurable, or adapted over time.

The events triggered by pixels 46 comprise multiple event parameters, such as the time at which the event was triggered, the position of the underlying pixel in pixel array 44 (e.g., specified by horizontal and vertical coordinates of the pixel in the pixel array), and a polarity value corresponding to increase or decrease of the luminance level that caused triggering the event.

The event parameters may be denoted collectively by a vector or tuple (t, x, y, p), wherein 't' denotes the event time of occurrence, 'x' and 'y' respectively denote horizontal and vertical coordinates of the pixel in the pixel array, and 'p' denotes the polarity value of the event. Events of this form are representable as points (t, x, y) in a Three-Dimensional (3D) space or grid defined over a time dimension, a horizontal dimension, and a vertical dimension. The size of this 3D space depends on the spatial resolution of pixel array 44 and on the time window selected for storing events simultaneously.

In some embodiments, EVS 24 outputs each event immediately as it occurs. In other embodiments, EVS 24 outputs events in frames, each of which reporting no events (e.g., an empty frame), or one or more events that were triggered within the frame duration.

EVS 24 may be coupled to event mediator 32 using any suitable interface (or interfaces). In some embodiments, the EVS receives EVS commands from the event mediator via a low-speed link or bus, such as, for example, the Inter-Integrated Circuit ($I^2C$) bus, or via the Serial Peripheral Interface (SPI). In some embodiments, the EVS sends events to the event mediator via a high-speed link such as, for example, the Camera Serial Interface (CSI) specified by the Mobile Industry Processor Interface (MIPI) Alliance, e.g., a two-lane D-PHY supporting a bit rate of 1.5 Gbps per lane. Alternatively, the EVS may send events to the event mediator over the Sony Scalable Low Voltage Signaling-Embedded Clock) SLVS-EC interface, e.g., a four-lane interface supporting a bit rate of 800 Mbps per lane.

Kernel processor 36 may be coupled to CV processor 28 using any suitable interface(s), e.g., similarly to the command and data interfaces used between the EVS and the event mediator, as described above. Alternatively, different types of interfaces may be used between the event mediator and each the EVS and CV processor.

Memory subsystem 40 comprises one or more storage units 60, an event linked list 64 and a storage mapping unit 65. Storage unit 60 comprises multi-mapping logic 66 and a storage unit memory 68. The overall storage space allocated for events that is aggregated across storage unit memories 68 is also referred to herein as an "event memory." The partition of the event memory into multiple storage unit memories 68 allows for efficient write and readout of certain groups of events, as will be described further below. Storage mapping function 65 maps events to respective storage units, as will be descried further below. The storage mapping function may be implemented within the kernel processor, in an embodiment.

In some embodiments, multi-mapping logic 66 predefines a plurality of mapping functions that map events to respective locations in memory 68. The full process of mapping a received event to a location in a memory 68 is generally referred to as a "mapping." In applying the mapping to an event, the mapping (or mapping functions) is applied to at least some of the event parameters of the events. In the present context, a "location" or an "address" in the event memory refers to a basic storage unit in the event memory, capable of storing a respective event (e.g., event data indicative of the event).

The mapping functions in multi-mapping logic 66 may comprise, for example, one-way functions. In the present context, the term "one-way function" refers to a function that maps a space having a large number of items to a space having a smaller number of (possibly other) items. For example, in some embodiments the large space may comprise the events represented as 3D points in the 3D space of events, and the smaller space may comprise addresses or locations used for storing these events in the event memory. An example of a one-way function is a "hash function," in which case the hash values returned by the hash function when applied to event parameters serve as the addresses or locations in the event memory.

Methods for writing events to storage unit memory 68 and for reading events from storage unit memory 68 will be described in detail further below. In general, multiple mapping functions may be applied to the same event for producing multiple locations in storage unit memory 68 for reducing the probability of reading a false event that was never written. The concept of false events and methods for avoiding them will be described below, e.g., with reference to FIGS. 2A and 2B.

It is noted that since addresses in storage unit memory 68 can be accessed randomly, writing and reading events to and from storage unit memory 68 is carried out efficiently at an O(1) complexity.

The left lower part of FIG. 1 depicts an example block diagram of a single storage unit 60. The storage unit comprises a multi-map read module 70 and a multi-map write module 72, which may be implemented within multi-mapping logic 66. The multi-map write module and multi-map read module respectively map events being written to the storage unit and events being read from the storage unit, to respective locations in storage unit memory 68, using the mapping functions as described above. In some embodiments, each storage units has a dedicated access path that is separated from access paths of other storage units. It is noted that the storage mapping function (65) is designed to ensure that no collision occurs when accessing multiple storage units in parallel to one another. This allows reading and/or writing events by multiple storage units in parallel to one another, e.g., in a single cycle without inserting a stall, thereby improving real-time performance.

In some embodiments, storage unit memory 68 comprises multiple memory banks 74. For multiple mapping functions applied to the same event, the resulting addresses fall in different memory banks with high probability, thereby allowing parallel access to the memory banks without causing stalls. When two or more of the addresses fall in different memory banks, the two or more locations can be accessed in parallel to one another without causing a stall.

Storage unit 60 further comprises a write (First-In First-Out) FIFO 76 and a read FIFO 78 for writing and reading events that are mapped to the same memory bank.

In some embodiments, kernel processor 36 stores events received from EVS 24 in event linked list 64 (typically in addition to storing the events in storage units 60). Writing events to the linked list is carried out at an O(1) complexity. Reading events from the linked list is, however, carried out at an O(n) complexity, wherein 'n' denotes the length of the linked list. Although in the example of FIG. 1, event linked list 64 resides in memory subsystem 40, in alternative embodiments, event linked list 64 or an additional similar linked list may reside in a memory externally to the event mediator (not shown), e.g., in a memory of CV processor 28.

Storage unit 60 comprises a controller 80 that receives commands from kernel processor 36 and executes them. The commands may comprise, for example, configuration commands for provisioning and/or selecting the mappings in multi-map read module 70 and multi-map write module 72, the division of storage unit memory 68 into multiple memory banks 74, and the like. The commands from kernel processor 36 to controller 80 may also comprise read commands for reading a single event or multiple events in parallel, query commands for querying whether a certain event has been written to the event memory or to the linked list, commands for writing and reading events to and from event linked list 64, and the like.

In some embodiments, the storage unit allows simultaneous read and write operations. In such embodiments, the storage logic writes an event to a given storage unit and reads another event from another storage unit in parallel to one another (within the same cycle).

The CV system configuration of FIG. 1 including EVS 24, CV processor 28 and event mediator 32 are given by way of example, which are chosen purely for the sake of conceptual clarity. In alternative embodiments, other suitable CV system, CV processor and event mediator configurations can also be used.

The division of functions among EVS 24, event mediator 32 and CV processor 28 may differ from the division shown in FIG. 1. For example, EVS 24 and/or CV processor 28 may implement at least part of the functionality and storage space of event mediator 32. In general, processor(s) and other hardware logic implementing the disclosed embodiments are collectively referred to as "processing logic."

Some elements of event mediator 32, such as kernel processor 36, and multi-mapping logic 66, may be implemented in hardware, e.g., in one or more Application-Specific Integrated Circuits (ASICs) or Field-Programmable Gate Arrays (FPGAs). Additionally or alternatively, some elements of event mediator 32 can be implemented using software, or using a combination of hardware and software elements.

In the CV system configuration shown in FIG. 1. EVS 24, event mediator 32 and CV processor 28 are implemented as separate Integrated Circuits (ICs). In alternative embodiments, however, EVS 24, event mediator 32 and CV processor 28 may be integrated on separate semiconductor dies in a single Multi-Chip Package (MCP) or System on Chip (SoC), and may be interconnected by internal buses. Alternatively, other distributions of EVS 24, event mediator 32, and CV processor 28 into ICs can also be used.

In some embodiments, some of the functions of event mediator 32 may be carried out by one or more general-purpose processors, e.g., kernel processor 36, and/or one or more processors implementing multi-mapping logic 66, multi-map read 70, multi-map write 72 and controller 80; the processor(s) are programmed in software to carry out the functions described herein. The software may be downloaded to the relevant processor(s) in electronic form, over a network, for example, or it may, alternatively or additionally, be provided and/or stored on non-transitory tangible media, such as magnetic, optical, or electronic memory.

Each of storage unit memory 68 and kernel memory 38 may comprise any suitable type of memory, such as, for example, a volatile memory such as a Random Access Memory (RAM), a nonvolatile storage such as a Flash memory, or a combination of two or more memory devices of different respective technologies.

Elements that are not necessary for understanding the principles of the present disclosure, such as various interfaces, addressing circuits, timing and sequencing circuits and debugging circuits, have been omitted from the figure for clarity.

Methods for Mapping Events to Addresses in the Event Memory

As noted above, events triggered by EVS 24 are representable as Three-Dimensional (3D) points in a 3D cartesian space (or grid). In many applications, the actual number of events generated within a specified time window is very small relative to the overall number of points (events) in the entire 3D grid. For example, the actual number of events occupying respective points in the 3D grid at any given time may be on the order of 100-1000 times smaller than the overall number of points in that 3D grid. This observation implies that the actual events associated with points in the 3D grid are sparse, and therefore the event memory may have a storge space much smaller than the full storage space required for the entire number of points in the 3D grid.

Figure 2A:
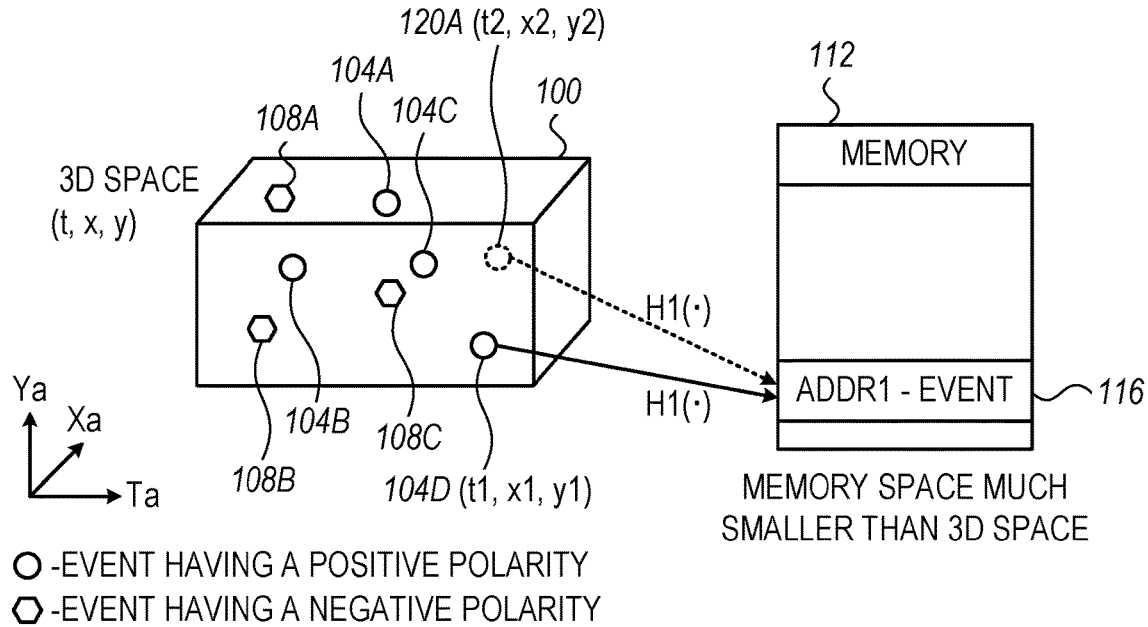
FIGS. 2A and 2B are diagrams that schematically illustrate methods for mapping events to addresses in an event memory, in accordance with an embodiment that is described herein.
Figure 2B:
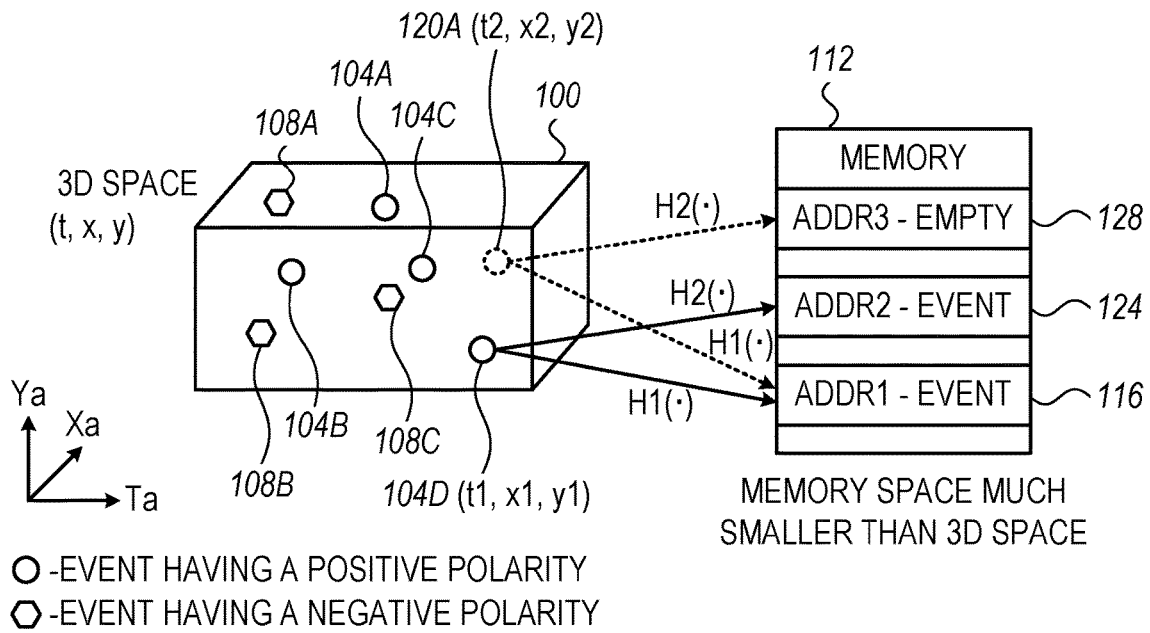

FIGS. 2A and 2B are diagrams that schematically illustrate methods for mapping events to addresses in an event memory, in accordance with an embodiment that is described herein. Mapping the events may be carried out using any suitable mapping(s), e.g., one-way function(s) such as hash function(s).

The methods described with reference to FIGS. 2A and 2B may be executed, for example, by storage unit 60 of FIG. 1.

In FIGS. 2A and 2B, a 3D space 100 is specified by a time axis denoted 'Ta', a horizontal axis denoted 'Xa', and a vertical axis denoted 'Ya'. An event denoted by a vector of event parameters (t, x, y, p) generated by EVS 24 at a time 't' by a pixel whose coordinates in pixel array 44 are 'x' and 'y', is associated with a virtual 3D point (t, x, y) in the 3D space, and the parameter 'p' denotes the polarity value of the event in question.

Mapping the event parameters to an address in the event memory and writing/reading event data to and from that location can be carried out in various ways. In the present context, the term "event data" refers to any suitable information stored in the event memory (or linked list) indicative of the event. The event data may comprise, for example, one or more parameters of the underlying event, a notification of whether an event has been written to the event memory, a counter that increments upon writing an event, or an output of function applied to event parameters (x, y, t, p) and data stored in target memory.

For example, in some embodiments, a mapping is applied to the event parameters (t, x, y, p) to produce a given memory address in the event memory, and a notification that an event has been stored in the given address is written in that address. The mapping is associated with the polarity value p. For example, in one embodiment, different mapping functions are applied to the (t, x, y) parameters based on the polarity value. In another embodiment, a single mapping function produces different addresses for different respective polarity values. Upon reading this event, the mapping is applied to the (t, x, y, p) parameters to produce the same given address. The event is verified to be valid by checking the notification value in the given address.

In FIGS. 2A and 2B, events having a positive polarity value are depicted by circles, and events having a negative polarity are depicted by hexagons. In the present example, 3D space 100 contains positive-polarity events 104A . . . 104D, and negative-polarity events 108A . . . 108C.

An event memory 112 stores EVS events, and may be used, for example, in implementing one or more storage unit memories 68 and/or memory banks 74 of FIG. 1. As shown in FIG. 2A, to write an event associated with a 3D point (t1, x1, y1) and polarity p1 in event memory 112, a mapping function denoted H1(•) maps the corresponding event parameters (t1, x1, y1, p1) to a respective address 116 (denoted ADDR1) in event memory 112, and a notification that the event has been stored is written in ADDR1. Upon reading event 104D, the same mapping H1(•) is applied to the event parameters (t1, x1, y1, p1) to produce memory address ADDR1, and if this address contains a notification of a written event, the event is verified to be valid.

Since the number of events in 3D space 100 is much larger than the number of addresses or locations used for storing events in event memory 112, two or more events in the 3D space are necessarily mapped by H1(•) to a common memory address. For example, let (t2, x2, y2) denote a 3D point of another event 120A having a polarity p2. Unlike 3D point (t1, x1, y1) of event 104D that corresponds to an actual event that was written to address ADDR1, 3D point (t2, x2, y2), may be occupied by an event or otherwise be unoccupied. In the present example, mapping of the two events by calculating H1(t1, x1, y1, p1) and H1(t2, x2, y2, p2) results in the same memory address ADDR1. Such a case in which different events are undesirably mapped to a common location in event memory 112 is referred to as a "collision."

When event 104D is written to memory 112 but event 120A is not, reading an event by calculating H1(t2, x2, y2, p2) will result in memory address ADDR1 that contains an a notification of a written event, causing a false event.

The probability of collision depends on (i) the ratio between the overall number of points (or events) in 3D space 100, and the number of locations allocated for events in event memory 112, and (ii) the sparsity level of the 3D grid, e.g., the actual number of events occupying the 3D space. The probability of collision also depends on the characteristics of the mapping used, and on the distribution of the events in the 3D space. In other words, different combinations of mapping functions and event distributions may result in different collision rates. Generally, for a given 3D space, the probability of collision increases with decreasing the number of locations allocated for events in memory 112, and with increasing the number of actual events occupying the 3D space.

As noted above, a collision may cause reading a false event. In some embodiments, a Bloom filter approach is adopted for decreasing the probability of false events. The bloom filter is described, for example, in "Space/time tradeoffs in hash coding with allowable errors," in Communications of the ACM, volume 13, issue 7, July 1970, pages 422-426. In such embodiments, multiple different mappings are applied to the same event, as described herein with reference to FIG. 2B.

In some embodiments that employ the Bloom filter approach, a mapping maps an event to multiple respective addresses in the event memory. In writing an event, event data is stored (or updated) in each of the multiple addresses. In reading or querying the event, the mapping is applied to the event parameters to produce the same multiple memory addresses. The event is verified to be valid when all the mapped addresses jointly satisfy a verification condition. For example, when the event data indicates whether the event has been written to the event memory, the verification condition is met when all the mapped addresses contain a notification indicating that the event has been written to the event memory. In the example of FIG. 2B, two mapping functions denoted H1(•) and H2(•) are used. In alternative embodiments, however, any other suitable number of mappings can also be used. Event 104D is mapped to memory address ADDR1 using H1 as described above, and to address ADDR2 (124) using H2. An notification of a written event is therefore stored in both target locations ADDR1 and ADDR2. Event 120A (depicted as a dotted circle) is mapped to ADDR1 using H1 and to ADDR3 (128) using H2, but no event is stored in association with ADDR3. Upon reading event 120A, both ADDR1 and ADDR2 are checked. In the present example ADDR1 contains a notification of a written event (corresponding to potential actual event 104D) but ADDR3 does not contain any notification of a written event. Consequently, the verification of event 120A to be a valid event fails, and no false event is created.

Figure 3:
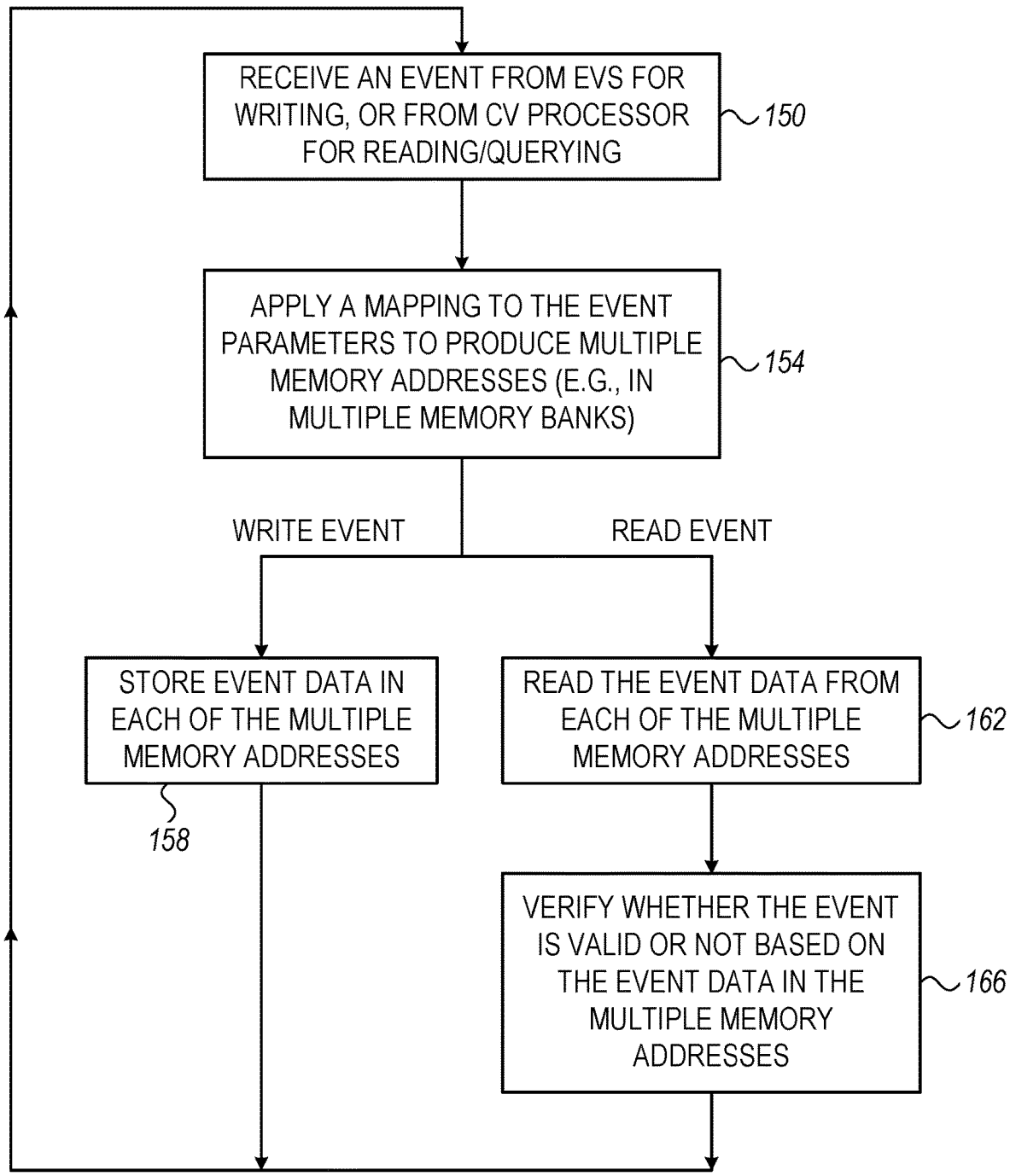
FIG. 3 is a flow chart that schematically illustrates a method for writing events to and reading events from an event memory, in accordance with an embodiment that is described herein.

FIG. 3 is a flow chart that schematically illustrates a method for writing events to and reading events from an event memory, in accordance with an embodiment that is described herein.

The method will be described as executed by storage unit 60. The method begins at a reception step 150, with storage unit 60 receiving an event from EVS 24 to be written in storage unit memory 68, or from CV processor 28 for reading or querying an event in storage unit memory 68. Alternatively or additionally, the events received from the CV processor may be written to the event memory similarly to events received from the EVS. This may be relevant, for example, when the CV processor is required to store processed events. In the present example, events received from the EVS and from the CV processor comprise event parameters (t, x, y, p).

At a mapping step 154, the storage unit applies a mapping to at least some of the event parameters to produce multiple respective memory addresses.

In some embodiments, at least some of the multiple mappings fall in different memory banks 74. This allows accessing multiple addresses to which the event is mapped in parallel to one another, thereby increasing throughput and decreasing latency. In some embodiments, the storage unit maps events that differ only in the polarity values to memory addresses or locations in different memory banks.

Next, the method splits between writing events and reading/querying events. At an event writing step 158, the storage unit stores event data in each of the memory addresses produced at step 154. In storing the event data, the storage unit stores in each of the multiple addresses information indicative of the event, e.g., an indication of a written event.

In some embodiments, upon writing an event, the storage unit updates event data in the multiple memory addresses, e.g., by applying to the event data a suitable function. Upon reading the given event from the event memory, the storge unit verifies that the given event is valid by verifying that the event data in all the multiple memory addresses meet a specified verification criterion.

At an event reading step 162, the storage unit reads event data from each of the memory addresses produced at step 154 such as the indication of whether the underlying event has been written to the event memory. At a validation step 166, the storage unit validates the read/queried event by verifying that all the memory addresses of step 154 indicate that the event has been written.

Following each of steps 158 and 166, the method loops back to step 150 to receive subsequent event data.

In the example method of FIG. 3, the event data stored in each of the addresses to which the event is mapped is indicative of whether the event has been stored in the event memory. This, however, is not mandatory, and other types of event data can also be used.

For example, in some embodiments, the event data stored in each of the multiple addresses to which the event is mapped comprises a counter value. Upon writing a given event, the counter values are incremented in all the addresses to which the given event is mapped. Upon reading the given event from the event memory, in order to verify that the given event is valid, the counter values in all the multiple locations are checked to exceed a specified threshold number.

Using counter values for the event data, allows to filter out certain events. In an example embodiment, the multiple hash functions are generated so as to map events that are close to one another in time and position in the 3D space, to similar addresses in the event memory. Consequently, at least some of such events will be mapped to common addresses. When neighboring events are received from the EVS, storing these events will increment the counters in some the relevant addresses, multiple times, e.g., high enough to be detected as valid events. On the other hand, non-neighboring events will increment the counters in the relevant addresses only once, and therefore will likely to be identified as invalid events.

Efficient Access of Groups of Events

In some embodiments, memory subsystem 40 supports parallel accessing of multiple events. In some embodiments, parallel writing of multiple events received from the EVS to the memory subsystem, and parallel readout of multiple events from the memory subsystem by the CV processor is carried out in certain groups of the events. A group of events typically comprises multiple events that are close to one another in time (t parameter) and space (x and y parameters) of the underlying 3D space. For example, the CV processor may be required to read a group of events having a certain temporal-spatial pattern in the 3D space, as described herein. The 3D space is also referred to herein as a "temporal-spatial domain."

In some types of event groups, all the events have a common time parameter. The events in such groups may form, for example, a row along the horizontal axis, a column along the vertical axis, a two-dimensional rectangle or square along both the horizontal and vertical axes, or any other suitable 2D geometrical shape. In another type of groups, the events may form a 3D cube or any other suitable 3D geometrical pattern along the three axes of the underlying 3D space.

In some embodiments, memory subsystem 40 maps the events in certain groups of events into multiple respective storage units 60 that are accessible in parallel to one another, thereby allowing for parallel writing and/or reading of at least some of the multiple events in the group within a single cycle.

In some embodiments, the event mediator may filter out some of the events retrieved from the memory subsystem. For example, in reading a group of events together, the kernel processor outputs the retrieved events to the CV processor only when the number of events in the group that are successfully validated exceeds a specified threshold number.

Figure 4:
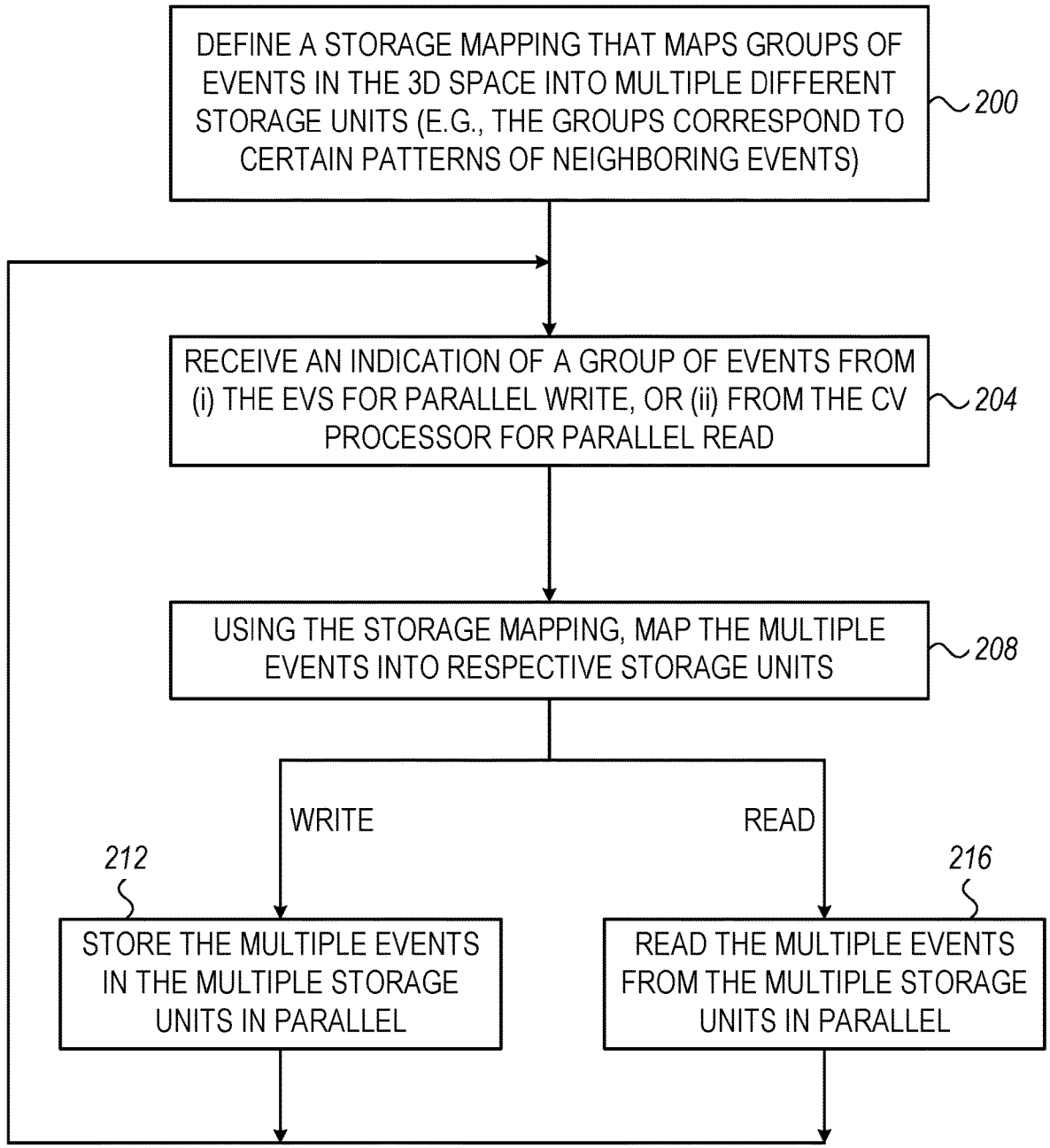
FIG. 4 is a flow chart that schematically illustrates a method for parallel accessing of multiple events, in accordance with an embodiment that is described herein.

FIG. 4 is a flow chart that schematically illustrates a method for parallel accessing of multiple events, in accordance with an embodiment that is described herein.

The method begins at a group definition step 200, at which event mediator 32 defining a storage mapping that maps the events in a specified group of events to multiple respective different storage units 60. The events in the group typically form some desired geometrical pattern in the underlying 3D space of events. In some embodiments, the storage mapping defined at step 200 is applicable to multiple different groups of events.

At a reception step 204, event mediator 32 receives (e.g., via kernel processor 36) an indication of a group of events received from EVS 24 for writing the events in the group to the memory subsystem, or from CV processor 28 for reading/querying the events in the group from the memory subsystem. At a storage unit mapping step 208, the memory subsystem maps the multiple events in the underlying group to multiple respective storage units 60 using the storage mapping.

In the case of event writing, the memory subsystem stores (at least some of) the multiple events in the respective storage units in parallel to one another (within a single cycle), at a parallel writing step 212. In case of event reading/querying, the memory subsystem reads (at least some of) the multiple events from the respective storage units in parallel to one another (within a single cycle), at a parallel reading step 216. Steps 212 and 216 may be implemented, for example, using the method of FIG. 3 above.

Following each of steps 212 and 216, the method loops back to step 200, to receive a subsequent group of events.

Next is described an example embodiment in which the event mediator comprises 64 storage units 60, and therefore can simultaneously map up to 64 different events of a common group to respective 64 storage units. In this example, the storage mapping maps 64 events to respective 64 storage units. Assuming that the events are specified as 3D points in the 3D space using the vector of event parameters (t, x, y), example groups in the 3D grid may contain 1-by-64-by-1 rows of events, 1-by-1-by-64 columns of events, 1-by-8-by-8 Two-Dimensional (2D) squares, and/or 4-by-4-by-4 cubes. In this example embodiment, the size of storage unit memory 68 equals 1/64 the size of the entire event memory.

A storage mapping suitable for the example groups above is depicted in an Appendix section below. This example storage mapping is defined using four 8-by-8 tables denoted Table 1 . . . . Table 4, corresponding to four consecutive time units denoted t=n−3, t=n−2, t=n−1 and t=n. The numbers in the tables denote indices of the storage units in the range 1 . . . 64. In some embodiments, to access a given table, a modulo-4 operation is applied to the 't' parameter of the underlying event. Moreover, to access the index in that table, a modulo-8 operation is applied to each of the x and y parameters of the event. Alternatively, any other suitable methods for accessing the tables and their content can also be used.

As can be seen, using the example storage mapping above, no group comprising a 64 row, a 64 column, a 2D 8-by-8 square or a 3D 4-by-4-by-4 cube contains two or more events that are mapped to a common storage unit. In other words, each event in the above groups is mapped to a dedicated respective storage unit.

Embodiments Utilizing a Linked List

In some embodiments, the CV processor is required to retrieve events from the event memory so that at least some of the events are retrieved with their neighboring events. The neighboring events may belong, for example, to a cube of events surrounding the pivot event in the 3D space (the temporal-spatial domain).

In some embodiments, the event mediator supports the requirement of retrieving events with their neighbors using linked list 64. In these embodiments, the event mediator stores the events received from the EVS both in the event memory (e.g., in memory units 68 of storage units 60) and in linked list 64. Upon reading events and their neighbors, the event mediator scans the linked list, and for each given event in the linked list (or for part of the events in the list) applies a group read operation from the event memory (e.g., the storage units), for reading a specified group of events surrounding the given event in the underlying temporal-spatial domain. Methods for reading a group of multiple events from multiple storage units concurrently were described above, and are applicable in reading events plus neighbors as described in the present paragraph.

Adopting the Rate of False Events to Varying Conditions

As noted above, an event that was mapped and written to a given address may give rise to reading false events that are mapped to the same given address, but never written to the event memory. As explained above, false events may be detected by mapping each event to multiple addresses (e.g., using multiple mapping functions) in the event memory and storing (or upon reading checking) suitable event data in each of the multiple addresses.

In general, increasing the number of addresses used per event (or the number of mapping functions used per event) typically reduces the rate of false events. When exceeding a certain number of mapping functions, however, the event memory may be overfilled and the system collapses, in which case the rate of false events may increase dramatically.

The rate of false events depends on various factors such the input rate of receiving events, the number of mapping functions used per event, the type of mapping functions used, and the size of the event memory.

In some embodiments, the CV processor runs an application that requires a specified rate of false events. Assume a plurality of mapping functions, from which multiple mapping functions are currently selected. In such embodiments, to control the rate of the false events so as to meet the specified rate of false events and a rate of the events received from the pixels, the storage unit reselects the multiple mapping functions from among the plurality of the mapping functions. Reselection of the multiple mapping functions means modifying the number of the selected mapping functions used per event, modifying the types of one or more of the selected mapping functions, or both.

In some embodiments, the received events are distributed in accordance with a temporal-spatial distribution that varies in time. For example, multiple events may be close to one another in the 3D space, which using certain mapping function may result in a high rate of false events. In some embodiments, the event mediator monitors the temporal-spatial distribution of the received events (e.g., in a pre-processing stage), and controls the rate of false events by performing one or more of: (i) reselecting the multiple mapping functions from among the plurality of the mapping functions, (ii) modifying a storage space size allocated to the event memory, and (iii) filtering out some of the received events. The event mediator may also reselect the multiple mapping functions depending on noise level in the EVS and/or other parts of the CV system.

In other embodiments, the event mediator controls the rate of false events, by dynamically allocating storage space to the event memory.

The embodiments described above are given by way of example, and other suitable embodiments can also be used. For example, although the embodiments above refer mainly to binary polarity values, in alternative embodiments, multi-bit polarity values can also be used.

Although the embodiments described herein mainly address EVS-based CV systems, the methods and systems described herein can also be used in other applications, such as in using any vision sensor that outputs sparse data such as RGB sensor having a low number of bits per pixel, in direct Time of Flight (dToF) sensor, and the like.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

APPENDIX

TABLE 1

Time = n − 3

| 37 | 38 | 39 | 40 | 33 | 34 | 35 | 36 |
| 45 | 46 | 47 | 48 | 41 | 42 | 43 | 44 |
| 53 | 54 | 55 | 56 | 49 | 50 | 51 | 52 |

TABLE 1-continued

Time = n − 3

| 61 | 62 | 63 | 64 | 57 | 58 | 59 | 60 |
| 5  | 6  | 7  | 8  | 1  | 2  | 3  | 4  |
| 13 | 14 | 15 | 16 | 9  | 10 | 11 | 12 |
| 21 | 22 | 23 | 24 | 17 | 18 | 19 | 20 |
| 29 | 30 | 31 | 32 | 25 | 26 | 27 | 28 |

TABLE 2

Time = n − 1

| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |
| 1  | 2  | 3  | 4  | 5  | 6  | 7  | 8  |
| 9  | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |

TABLE 3

Time = n − 1

| 5  | 6  | 7  | 8  | 1  | 2  | 3  | 4  |
| 13 | 14 | 15 | 16 | 9  | 10 | 11 | 12 |
| 21 | 22 | 23 | 24 | 17 | 18 | 19 | 20 |
| 29 | 30 | 31 | 32 | 25 | 26 | 27 | 28 |
| 37 | 38 | 39 | 40 | 33 | 34 | 35 | 36 |
| 45 | 46 | 47 | 48 | 41 | 42 | 43 | 44 |
| 53 | 54 | 55 | 56 | 49 | 50 | 51 | 52 |
| 61 | 62 | 63 | 64 | 57 | 58 | 59 | 60 |

TABLE 4

Time = n

| 1  | 2  | 3  | 4  | 5  | 6  | 7  | 8  |
| 9  | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

The invention claimed is:

1. An apparatus comprising:

an event memory, configured to store events corresponding to a plurality of pixels, wherein the events are indicative of changes in luminance levels detected by the pixels; and processing logic, configured to:

define a mapping that maps events to respective locations in the event memory;

receive a given event generated by a given pixel among the plurality of pixels, map the given event to multiple locations in the event memory using the mapping, and store event data indicative of the given event in the multiple locations; and in reading the given event, map the given event to the multiple locations in the event memory using the mapping, and verify that the given event is valid based on the event data stored in the multiple locations.

2. The apparatus according to claim 1, wherein the plurality of pixels are arranged in a Two-Dimensional (2D) array, wherein the event comprises multiple event parameters including
  (i) a time of occurrence of the given event (ii) a position of the given pixel in the 2D array, and
  (iii) a polarity value associated with a variation of the luminance level detected by the given pixel.

3. The apparatus according to claim 1, wherein the event data indicates whether the given event has been written to the event memory, and wherein the processing logic is configured to verify that the given event is valid by verifying that the event data in all the multiple locations indicates that the given event has been written to the event memory.

4. The apparatus according to claim 1, wherein the event data comprises a counter value, wherein the processing logic is configured to increment the counter value in the multiple locations upon writing the given event to the event memory, and upon reading the given event from the event memory, to verify that the given event is valid by verifying that the counter values in all the multiple locations exceed a specified threshold number.

5. The apparatus according to claim 1, wherein the processing logic is configured to update event data in the multiple locations upon writing the given event to the event memory, and upon reading the given event from the event memory, to verify that the given event is valid by verifying that the event data in all the multiple locations meet a specified verification criterion.

6. The apparatus according to claim 1, wherein the mapping comprises a plurality of mapping functions for generating the respective locations, wherein the processing logic is configured to map the given event to the multiple locations using multiple respective mapping functions selected from among the plurality of the mapping functions.

7. The apparatus according to claim 6, wherein the selected mapping functions are associated with a polarity value of the given event.

8. The apparatus according to claim 6, wherein an application receiving the events requires a specified rate of false events that were never written to the event memory, and wherein the processing logic is configured to control the rate of the false events so as to meet the specified rate of false events and a rate of the events received from the pixels, by reselecting the multiple mapping functions from among the plurality of the mapping functions.

9. The apparatus according to claim 6, wherein a temporal-spatial distribution of the received events varies in time, and wherein the processing logic is configured to monitor the temporal-spatial distribution of the received events, and to control a rate of false events that were never written to the event memory, among the events being read from the event memory, by performing one or more of: (i) reselecting the multiple mapping functions from among the plurality of the mapping functions, (ii) modifying a storage space size allocated to the event memory, and (iii) filtering out some of the received events.

10. The apparatus according to claim 6, wherein the event memory comprises multiple memory banks that are accessible in parallel to one another, and wherein the processing logic is configured to map the given event, using the selected multiple mapping functions, to respective locations in one or more of the multiple memory banks.

11. The apparatus according to claim 10, wherein the event memory is partitioned into multiple separate storage units that are accessible in parallel, and wherein the processing logic is configured to map multiple events to the respective storage units using a predefined storage mapping function, to further map the multiple events, using the multiple selected mapping functions, to memory locations in the event memory belonging to the respective storage units, and to access the multiple events in parallel to one another.

12. The apparatus according to claim 11, wherein the processing logic is configured to both (i) write an event to a given storage unit and (ii) read another event from another storage unit, in parallel to one another.

13. The apparatus according to claim 1, wherein the processing logic is configured to control a rate of false events that were never written to the event memory, by dynamically allocating storage space to the event memory.

14. The apparatus according to claim 1, wherein the events are representable in a temporal-spatial domain, and wherein the processing logic is configured to store multiple received events both in the event memory and in a linked list data structure, and wherein in reading a required event along with a group of multiple events surrounding the required event in the temporal-spatial domain, to scan the linked list for identifying the required event in the linked list, and to read the required event and the surrounding events from the event memory.

15. The apparatus according to claim 1, wherein the given event comprises multiple event parameters, and wherein the processing logic is configured to apply the mapping to at least some of the multiple event parameters of the given event.

16. A method comprising:
  storing in an event memory, events corresponding to a plurality of pixels, wherein the events are indicative of changes in luminance levels detected by the pixels;
  defining a mapping that maps events to respective locations in the event memory;
  receiving a given event generated by a given pixel among the plurality of pixels, mapping the given event to multiple locations in the event memory using the mapping, and storing event data indicative of the given event in the multiple locations; and
  in reading the given event, mapping the given event to the multiple locations in the event memory using the mapping, and verifying that the given event is valid based on the event data stored in the multiple locations.

17. The method according to claim 16, wherein the plurality of pixels are arranged in a Two-Dimensional (2D) array, wherein the event comprises multiple event parameters including (i) a time of occurrence of the given event (ii) a position of the given pixel in the 2D array, and (iii) a polarity value associated with a variation of the luminance level detected by the given pixel, and wherein applying the mapping comprises applying the mapping to at least some of the event parameters.

18. The method according to claim 16, wherein the event data indicates whether the given event has been written to the event memory, and wherein verifying that the given event is valid comprises verifying that the event data in all the multiple locations indicates that the given event has been written to the event memory.

19. The method according to claim 16, wherein the event data comprises a counter value, and comprising incrementing the counter value in the multiple locations upon writing the given event to the event memory, and upon reading the given event from the event memory, verifying that the given event is valid by verifying that the counter values in all the multiple locations exceed a specified threshold number.

20. The method according to claim 16, and comprising updating event data in the multiple locations upon writing the given event to the event memory, and upon reading the given event from the event memory, verifying that the given event is valid by verifying that the event data in all the multiple locations meet a specified verification criterion.

\* \* \* \* \*